INVENTORS.
Carl D. Peterson
BY Albert H. Leimel
Bodell & Thompson
ATTORNEYS.

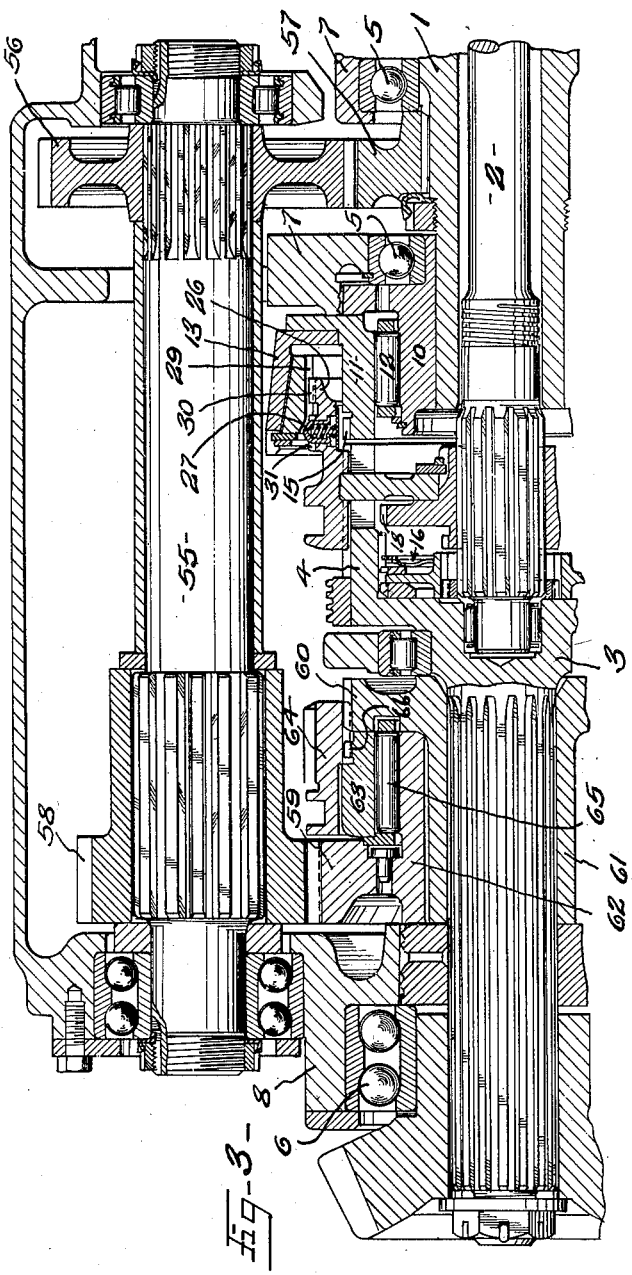

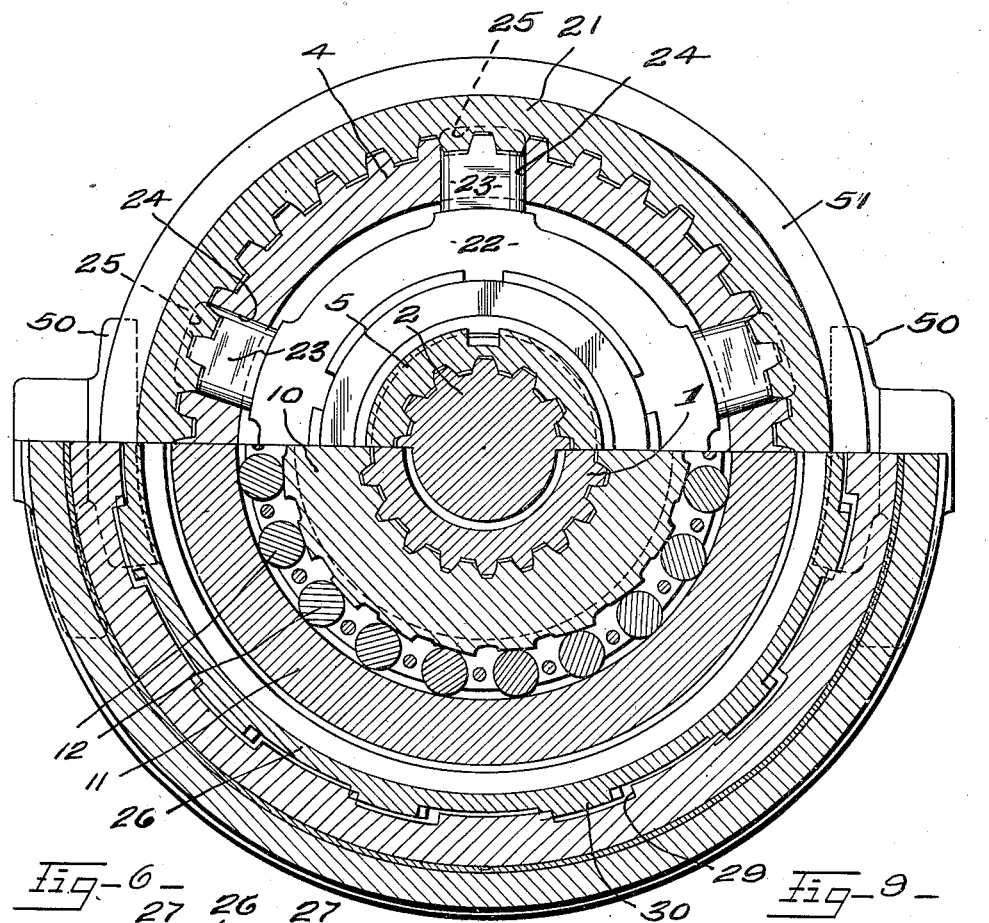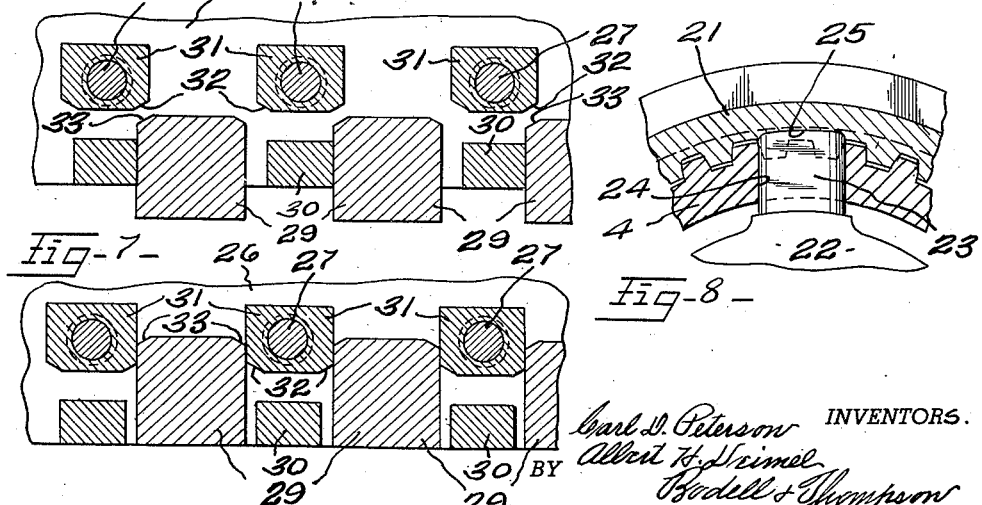

UNITED STATES PATENT OFFICE 2,399,568

TRANSMISSION MECHANISM

Carl D. Peterson and Albert H. Deimel,
Toledo, Ohio

Application September 29, 1943, Serial No. 504,231

8 Claims. (Cl. 192—48)

This invention relates to transmission mechanisms for heavy-duty use or use in vehicles, and has for its object a clutch mechanism including a single shiftable member as a clutch collar, which is shiftable in one direction from neutral to effect clutching engagement between one of the two drive shafts, and a driven shaft, and in the opposite direction from neutral to effect clutching engagement between the other of the two drive shafts and the driven shaft, the two drive shafts having a differential movement. It further has for its object a transmission mechanism or clutch construction or assembly embodying a synchronizing clutch through which intermediate speeds are effected and a balking ring clutch through which direct drive is effected, both the intermediate speeds and direct drive clutches being operated by a single shiftable member operable in opposite directions from neutral. The intermediate drives are usually through a hydraulic coupling or torque converter interposed between the motor and engine and one of the drive shafts.

The invention further has for its object inner and outer concentric drive shafts, a driven shaft alined therewith and having a head enclosing such clutch mechanism and on which the clutch member or collar common to both clutch mechanisms is mounted, the outer drive shaft being usually actuated from the engine through a hydraulic coupling, torque converter or something having a slip action and also controlled by an engine clutch, and the inner drive shaft being in direct drive with the engine clutch and torque converter idle, as in our pending application, Serial Number 497,839, filed August 7, 1943, now Patent Number 2,397,883, issued April 2, 1946.

The invention consists in the novel features and in the combinations and constructions hereinafter set forth and claimed.

In describing this invention, reference is had to the accompanying drawings in which like characters designate corresponding parts in all the views.

Figure 3 is a fragmentary sectional view showing the indirect or first speed drive for the driven shaft.

Figure 6 is a sectional view taken approximately on the line of 6—6, Figure 1.

Figures 7 and 8 are diagrammatic sectional views taken approximately on line 7—7, Figure 1.

Figure 9 is a sectional view taken approximately on line 9—9, Figure 1.

Figure 1:
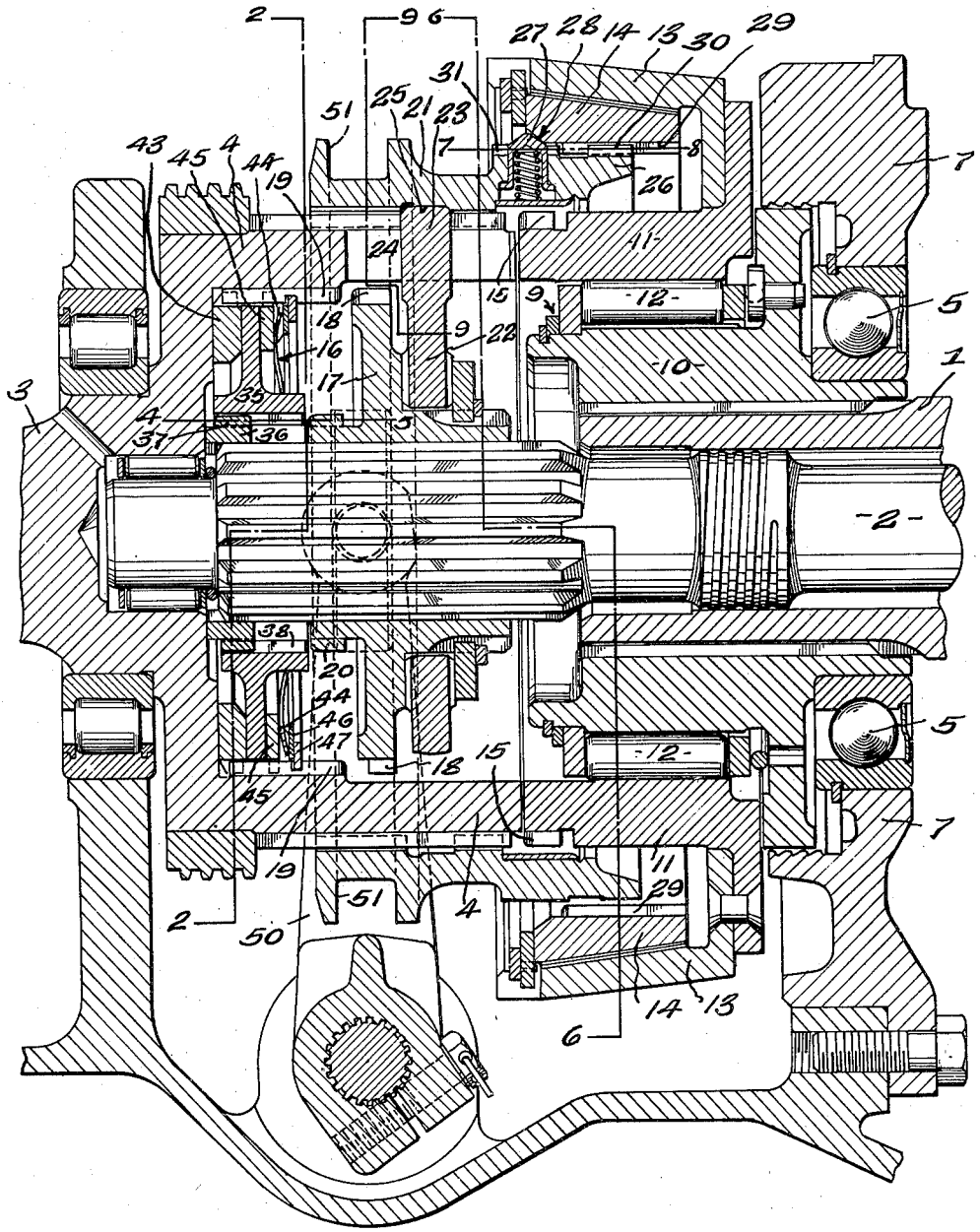
Figure 1 is a longitudinal sectional view through this mechanism.
Figure 2:
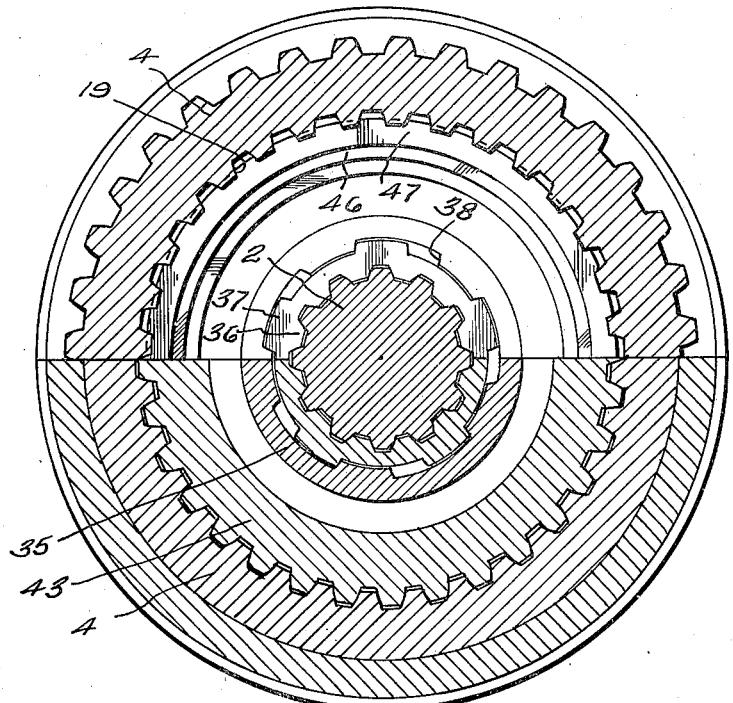
Figure 2 is a sectional view taken approximately on line 2—2, Figure 1.

This mechanism comprises, generally, inner and outer concentric drive shafts, a driven shaft axially alined therewith, clutch mechanism operable to clutch the driven shaft and one of the drive shafts together and to clutch the driven shaft and the other drive shaft together in different drives, this clutch mechanism including a shiftable member common to both and shiftable in one direction from neutral to effect the drive from one drive shaft and in the other direction from neutral to effect the drive from the other drive shaft, the drive shafts having a differential movement. The mechanism further includes an indirect reduction gearing between the outer drive shaft and the driven shaft.

1 and 2 designate outer and inner concentric drive shafts, the outer drive shaft being usually the output shaft of a hydraulic torque converter, the impeller of which is actuated by an engine, and the inner shaft 2 being actuated directly from the engine. 3 designates a driven shaft axially alined with the concentric shafts 1, 2 and spaced axially therefrom, this having a cylindrical head 4 enclosing a space between the drive shafts and the driven shaft. The concentric drive shafts and the driven shaft are journalled in suitable bearings, as 5, 6, in walls 7, 8, of a gear casing. As the drives from the outer shaft 1 are intermediate drives, the driven shaft 3 or the head 4 thereof is driven through an over-running clutch designated generally 9. This includes an inner race or cam 10 mounted on and rotatable with the outer shaft 1, an outer race 11 and rollers 12 between them. The intermediate drives are effected through a synchronizing clutch including a friction section 13 rotatable with the outer race 11, a friction section 14 rotatable with the driven shaft or the head 4, as will be hereinafter described, and jaw or toothed faces 15 on the outer race for coacting with teeth on the clutch collar to be presently described. The direct drive from the drive shaft 2 is effected through a balking ring clutch designated, generally 16, and a toothed clutch section 17 slidably splined on the projecting end of the shaft 2 within the head 4, and having clutch teeth 18 for coacting with complemental teeth 19 on the inner face of the head 4 when shifted into engagement therewith. The section 17 is also provided with a ring of balking teeth or projections 20. The clutch section 17 is operated by a clutch member or collar 21 common to both the synchronizing and balking ring clutches, this being splined to and slidable axially on the periphery of the head 4 and connected to the clutch section 17 by an annular fork or spider 22 working in a suitable groove in the hub of the section 17 and having radially extending posts or arms 23 extending through lengthwise slots 24 in the head 4 and seating at their ends in depressions at 25 in the clutch collar 21, so that the section 17 will be shifted axially when the clutch collar 21 is shifted in. The shifting, however, of the section 17, in one direction, as to the right, is an idle one, when the synchronizing clutch is being engaged.

The synchronizing clutch is energized by the shifting of the clutch collar 21 to the right, the clutch collar having an axial annular extension 26 encircling the outer race 11 and extending within the synchronizing friction clutch member 14, and connected thereto through projections or splines, so that the friction section 14 rotates with the clutch collar, and hence with the driven shaft 3. The clutch collar is yieldingly connected to the friction section 14 of the synchronizing clutch to transmit the axial shifting movement to the right of the clutch collar 21 to the synchronizing friction section 14, this yielding connection being here shown as through radial spring-pressed poppets 27 coacting inclined-plane fashion at 28 with the friction section 14. During the shifting of the clutch collar 21 to the right (Figure 1), the friction section 14, which is conical, is thrust axially into frictional engagement with the complemental friction section 13. This engagement effects the transmission of torque, and hence the synchronization of the speeds of the outer shaft 1 and the driven shaft 3. When the speeds are synchronized, the shifting in force is continued and the poppets are depressed or cammed inward radially and pass into internal grooves, passages or splines 29 (Figures 7 and 8) in the friction section 14, while the ends of the internal splines of the clutch collar 21 are passing into interfitting clutching engagement with the clutch teeth 15 of the outer race 11. The friction synchronizing ring 14 is capable of having a limited rocking movement in a circumferential direction relatively to the clutch collar 21 or the extension 26 thereof. It is here shown as provided as connected or splined to the extension 26 by peripheral projections or teeth 30 extending between the internal splines 29 in the synchronizing friction ring 14 and being of less width than the spaces between the splines so that the friction ring 14 is capable of limited rocking movement. The clutch collar 21 or the extension 26 thereof is also provided with projections or teeth 31 of substantially the same width as the spaces between the splines 29, so as to slidably fit the same. These projections 31 are normally arranged out of the spaces between the projections or splines 29. The poppets 27 are mounted radially in the projections or splines 31.

When a shift is initiated to engage the synchronizing clutch by applying a shifting in force to the right (Figure 1) to the clutch collar 21, the splines or projections 30, 31 are in the position analogous to that shown in Figure 7 relative to the spaces between the splines 29, and hence the projections 31 are out of alinement with the spaces between the splines 29, and this initial shifting brings the beveled projections 31 into blocking engagement with the splines or projections 29 on one side or the other of the spaces between the splines 29. The corners of these coacting projections are beveled at 32, 33, and the bevel is of such inclination that the angles are cam angles and not complete blocking angles. The synchronizing friction sections 13, 14 being engaged, the speeds of the drive shaft 1 and the driven shaft 3 and its head 4 are synchronized through the synchronizing sections 13, 14, and as the speeds synchronize, continued shifting in force applied to the clutch collar 21 causes the cam angles to effect a relative rocking movement of the synchronizing friction section 14, and the clutch collar 21, thus alining the projections 31 with the spaces between the projections 29 so that complete shifting in of the clutch collar can be completed (see Figure 8), the complete shifting in bringing the right hand end of the splines of the clutch collar 21 into interfitting engagement with the clutch teeth 15 on the outer race of the overrunning clutch. The posts or arms 23 of the fork 22 fit the slots 24 with a sliding fit.

The construction of the synchronizing clutch per se forms no part of this invention but constitutes the subject matter of another application, Serial Number 497,841, filed August 7, 1943, now Patent No. 2,363,746, issued November 28, 1944.

Figure 4:
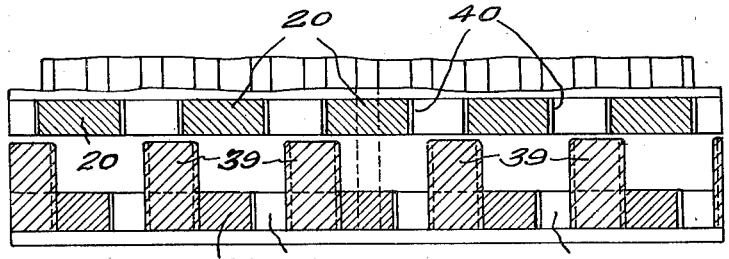
Figures 4 and 5 are diagrammatic sectional views showing the teeth of the clutch in balk position in Figure 4, and in unbalk position when the speeds cross in Figure 5.
Figure 5:
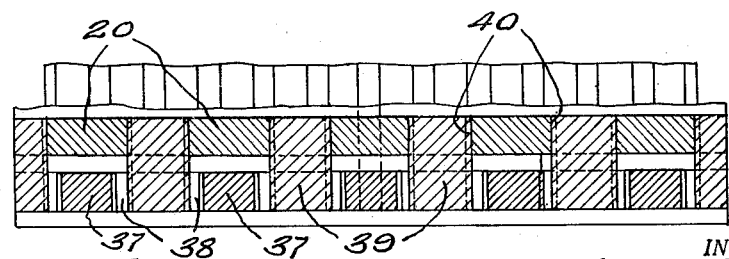

The drive between the drive shaft 2 and driven shaft 3 is through a balking ring clutch, this comprising a balking ring 35 having a hub splined on a collar 36 which in turn is splined on the shaft 2, the collar 36 having external splines 37 (Figure 4), which are of less width than the spaces 38 between the internal splines 39 on the hub of the balking ring 35, so that the balking ring 35 has a limited rocking movement in a circumferential direction and the ends of the balking teeth 20 of the clutch section and the ends of the teeth or internal splines 39 of the balking ring coact with a one hundred percent blocking movement, the splines 39 being of approximately the same width or fitting with a sliding fit in the spaces 40 between the blocking teeth 20. As shown in Figures 4 and 5, the splines 39 and blocking teeth 20 are not beveled but are flat angles. The balking ring coacts with a friction ring 43 rotatable with the head 4 and connected thereto by interfitting teeth and splines on the ring 43 and the internal splines 19 in the head 4. The outer ends or the right hand ends of the teeth 19 constitute clutch teeth for coacting with the clutch teeth 18. The balking ring 35 is initially loaded, as by a spring 44, here shown as in the form of a wave washer interposed between a ring 45 interlocked with the splines 19 and pressing against the side of the balking ring 35 opposite to that coacting with the friction ring 43, and a washer 46 thrusting against a lock ring 47 interlocked with the splines 19. Thus, the balking ring is pressed by the spring 44 into engagement with the friction ring 43 with the head 4, at all times with sufficient friction to cause the balking ring to be moved into the position shown in Figure 4 in which the balking teeth 39 are out of alinement with the spaces between the teeth 20.

In operation, when the clutch collar is shifted to the left from neutral, the clutch section 17 is shifted therewith through the annular fork of the spider 22. As the speeds are usually differential, the balking teeth 20 will assume a position analogous to that shown in Figure 4 and during the initial shifting in, completely block further shifting in until the speeds are crossed. The speeds are crossed by deceleration of the engine, as the shifting in is always a shift up from a low speed through the shaft 1 to a higher speed through the shaft 2. Now as the engine is decelerated, the balking ring 35 will be drawn back from the position analogous to that shown in Figure 4, until the speed of the shaft 2 is slightly less than the speed of the driven shaft 3. This will cause the teeth or projections 39 to be moved into the position centrally of the slots 38, as seen in Figure 5, and hence to aline with the spaces 40 between the blocking teeth 20, so that continued shifting in motion will cause the projections 37 to slide in the spaces 40 and the clutch teeth 18 to slide into interfitting engagement with the clutch teeth 19, this occurring after the speeds of the drive shaft 2 and shaft 3 have crossed. The clutch collar 21 may be shifted by any suitable mechanism, and here shown as a fork 50 working in a groove 51 in the clutch collar 21.

The indirect reduction gearing between the outer drive shaft 1 and the driven shaft 3 primarily to produce low speed forward comprises a countershaft 55 suitably journalled in the casing parallel to the axis of the drive shafts 1, 2 and the driven shaft 3 and extending across the head 4 and the clutches therein, a gear 56 mounted on one end of the shaft and meshing with the gear 57 on the outer drive shaft or the sleeve 1, a gear 58 on the other end of the countershaft 55 and meshing with a gear 59 concentric with the driven shaft 3, a clutch gear 60 splined on the driven shaft 3 in the rear of the head 4 and having an elongated hub 61 on the shaft 3, on which hub 61 the hub 62 of gear 59 is rotatably mounted and clutch means between the gear 59 and the clutch gear 60 here shown as including an overrunning clutch between the hub 61 and an outer race 63 and a clutch collar 64 coacting with the outer race 63 and the clutch collar 64. The hub 62 constitutes the inner race or cam of the overrunning clutch and 63 the outer race. 65 designates rollers between the two raceways. The clutch collar 64 has internal splines, which normally engage external teeth 66 on the outer race 63 and the peripheral teeth of the clutch gear 60. This clutch collar is shiftable so as to engage or interlock exclusively with the clutch gear 60 and it is shifted in any suitable manner. The clutch collar 64 is provided with external gear teeth, which mesh with a reverse spool, not shown, when the collar 64 is shifted into exclusive engagement with the clutch gear 60 and out of engagement with the outer race 63. Owing to the overruning clutch which includes the rollers 65, the driven shaft 3 can overrun the indirect drive when the shaft 2 is being driven through a higher gear ratio, as when being driven from the shaft 1 through the synchronizing clutch and collar 21 or when being driven from the drive shaft 2 through the balking ring clutch. Thus, in all normal speeds, the clutch collar 64 is in the position shown in Figure 3.

In operation, in starting with the clutch collar 21 in neutral position, the drive will be from the drive shaft 1 through the gears 57, 56, countershaft 55, gear 58 through the overrunning clutch to the collar 64 and thence to the clutch gear on the driven shaft 3. Upon shifting of the collar 21 to the right, the drive is through the synchronizing clutch 13, 14, 15, collar 21 to the head 4 of the driven shaft, the synchronizing clutch first synchronizing the speeds of the outer drive shaft 2 and the head 4, before the clutch collar can be shifted completely to interlock with the teeth 15. Shifting of the clutch collar 21 to the left from neutral first shifts the clutch section 17 into a position where the balking teeth 20 coact with the teeth 39 on the balking ring 35. Then the speeds are crossed by deceleration of the engine, and hence of the shafts 2 to effect crossing of the speeds, so that the teeth 20 aline with the spaces 38 between the teeth 39, so that continued shifting in force will cause the clutch teeth 18 to interfit between the clutch teeth 19. During the drive through the balking ring clutch, the overrunning clutch 9 permits the output shaft 3 to overrun at a greater speed than the shaft 1 or permits the shaft 1 to be absolutely dead.

What we claim is:

1. In a transmission mechanism, inner and outer concentric drive shafts, a driven shaft axially alined therewith, a pair of clutches for connecting the inner drive shaft to the driven shaft and the outer drive shaft to the driven shaft respectively, each including driving and driven sections, one of which is shiftable, the shiftable sections having a shifting collar in common and shiftable in opposite directions from neutral to shift one shiftable section to connect the outer drive shaft to the driven shaft and in the other direction from neutral to shift the other shiftable section to connect the inner drive shaft to the driven shaft, and an overrunning clutch between the outer drive shaft and the driving section of the clutch for clutching the driven shaft to the outer drive shaft.

2. In a transmission mechanism, inner and outer concentric drive shafts, a driven shaft axially alined therewith and having a hollow head, the inner drive shaft projecting into the head beyond the end of the outer drive shaft, an overrunning clutch comprising an inner race rotatable with the outer drive shaft, an outer race, and rollers between them, a shiftable drive clutch section on the projecting end of the inner drive shaft, a complemental driven clutch section rotatable with and located within the hollow head, a clutch collar slidably splined on said head and connected to said shiftable clutch section, and a second driving clutch section on the outer race, a complemental driven clutch section on said collar, the clutch collar operating when shifted in one direction from neutral to clutch said head to the outer race of the overrunning clutch and in the opposite direction from neutral to shift the first clutch section into clutching engagement with said head.

3. In a transmission mechanism, inner and outer concentric drive shafts, a driven shaft axially alined therewith, and having a hollow head, the inner drive shaft projecting into the head beyond the end of the outer drive shaft, an overrunning clutch comprising an inner race rotatable with the outer drive shaft, an outer race, and rollers between them, a shiftable clutch section on the projecting end of the inner drive shaft, a clutch collar slidably splined on said head and connected to the shiftable clutch section, the clutch collar operating when shifted in one direction from neutral to clutch said head to the outer race of the overrunning clutch and in the opposite direction from neutral to shift the clutch section into clutching engagement with said head, the outer race of the overrunning clutch being provided with clutch teeth and with one friction face of a synchronizing clutch and the clutch collar being provided with a complemental friction clutch face of the synchronizing clutch and with clutch teeth for coacting with the clutch teeth of the outer race, said clutch section and the head being provided with complemental clutch teeth.

4. In a transmission mechanism, inner and outer concentric drive shafts, a driven shaft axially alined therewith and having a hollow head, the inner drive shaft projecting into the head beyond the end of the outer drive shaft, an overrunning clutch comprising an inner race rotatable with the outer drive shaft, an outer race, and rollers between them, a shiftable drive clutch section on the projecting end of the inner drive shaft, a complemental driven clutch section rotatable with and located within the hollow head, a clutch collar slidably splined on said head and connected to said shiftable clutch section, a second driving clutch section on the outer race, and a complemental driven clutch section on said collar, the clutch collar operating when shifted in one direction from neutral to clutch said head to the outer race of the overrunning clutch and in the opposite direction from neutral to shift the first clutch section into clutching engagement with said head, the clutch within the hollow head including a balking ring and the clutch between the outer race and the shifting collar also including a synchronizer.

5. In a transmission mechanism, inner and outer concentric drive shafts, a driven shaft axially alined therewith, and having a hollow head, the inner drive shaft projecting into the head beyond the end of the outer drive shaft, an overrunning clutch comprising an inner race rotatable with the outer drive shaft, an outer race, and rollers between them, a shiftable clutch section on the projecting end of the inner drive shaft, a clutch collar splined on said head and connected to the shiftable clutch section, the clutch collar operating when shifted in one direction from neutral to clutch said head to the outer race of the overrunning clutch and in the opposite direction from neutral to shift the clutch section into clutching engagement with said head, the outer race of the overrunning clutch being provided with clutch teeth and with one friction face of a synchronizing clutch and the clutch collar being provided with the complemental clutch face of the synchronizing clutch and with clutch teeth for coacting with the clutch teeth of the outer race, a balking ring splined on the inner shaft to have a limited rocking movement in a circumferential direction, a friction face on said head for coacting with the balking ring, spring means for initially loading and energizing the balking ring, said clutch section being provided with clutch teeth complemental to clutch teeth on said head and with balking projections for coacting with the balking ring.

6. In a transmission mechanism, inner and outer concentric drive shafts, a driven shaft axially alined therewith, and a pair of clutches for connecting the inner drive shaft to the driven shaft and the outer drive shaft to the driven shaft respectively, each including driving and driven sections, one of which is shiftable, the shiftable sections having a shifting collar in common and shiftable in opposite directions from neutral to shift one shiftable section to connect the outer drive shaft to the driven shaft and in the other direction from neutral to shift the other shiftable section to connect the inner drive shaft to the driven shaft, the clutch of said pair of clutches between the inner drive shaft and the driven shaft including a balking ring and the other clutch of said pair including a synchronizer.

7. In a transmission mechanism, inner and outer concentric drive shafts, a driven shaft axially alined therewith, and a pair of clutches for connecting the inner drive shaft to the driven shaft and the outer drive shaft to the driven shaft respectively, each including driving and driven toothed sections, one of which is shiftable, the shiftable sections having a shifting collar in common and shiftable in opposite directions from neutral position, it being shiftable in one direction from neutral to shift one shiftable section to connect the inner drive shaft to the driven shaft and in the other direction from neutral to shift the other shiftable section to connect the outer drive shaft to the driven shaft, one of said clutches of the pair embodying a synchronizer.

8. In a transmission mechanism, inner and outer concentric differentially rotatable drive shafts, a driven shaft axially alined therewith and spaced axially therefrom, and having a head enclosing the space between the drive shafts and the driven shaft and having internal clutch teeth, the inner drive shaft extending beyond the outer shaft into said space, an overrunning clutch including inner and outer races and rollers between them, the inner race being mounted on the outer drive shaft, a synchronizing friction clutch member rotatable with the outer race, a clutch collar slidably splined on said head and having clutch teeth and also an axial extension encircling the end portion of the outer race, a second synchronizing friction clutch member slidably splined on the extension and coacting with the first synchronizing member and being mounted on the extension to have a limited rocking movement relatively thereto in a circumferential direction, cam blocking means on the extension and the second synchronizing member normally in blocking position and shiftable to unblocking position by the rocking movement of the second member as the speeds synchronize, yielding means for transferring the shifting in movement of the clutch collar to the second synchronizing clutch member, clutch teeth on the outer race for coacting with the clutch teeth of the clutch collar upon shifting in movement of the collar relatively to the inner synchronizing member, a balking ring clutch within the head including a balking ring mounted to have a limited rocking movement relatively to the inner drive shaft and being also provided with blocking teeth, an axially shiftable clutch section mounted on the projecting end of the inner drive shaft and connected to the clutch collar to be shifted axially thereby, said section having clutch teeth for coacting with clutch teeth on said head and balking teeth for coacting with the balking teeth of the balking ring.

CARL D. PETERSON.
ALBERT H. DEIMEL.